March 15, 1927.  1,620,719

C. P. BUCK

RELIEF VALVE FOR EXCESSIVE PRESSURE VAPOR TANKS AND LINES

Filed May 14, 1923

Inventor,
Charles P. Buck.

Witness:
R. E. Hamilton

By Thorpe & Girard
Attys.

Patented Mar. 15, 1927.

1,620,719

UNITED STATES PATENT OFFICE.

CHARLES P. BUCK, OF TOPEKA, KANSAS, ASSIGNOR TO GUSTIN-BACON MANUFACTURING COMPANY, OF KANSAS CITY, MISSOURI, A CORPORATION OF MISSOURI.

RELIEF VALVE FOR EXCESSIVE-PRESSURE VAPOR TANKS AND LINES.

Application filed May 14, 1923. Serial No. 638,844.

This invention relates to relief valves for excess pressure tanks and lines, and for other places where the conventional type of relief valve is objectionable on the ground of chattering, as a chattering valve is liable to uneven wear and to relatively rapid deterioration, my object being to produce a valve having a skirt of greater area than the valve seat, to insure the retention of the valve in open position under lesser pressure than that necessary to raise it, and to protect the valve and its passage from snow, hail and rain.

Figure 1:
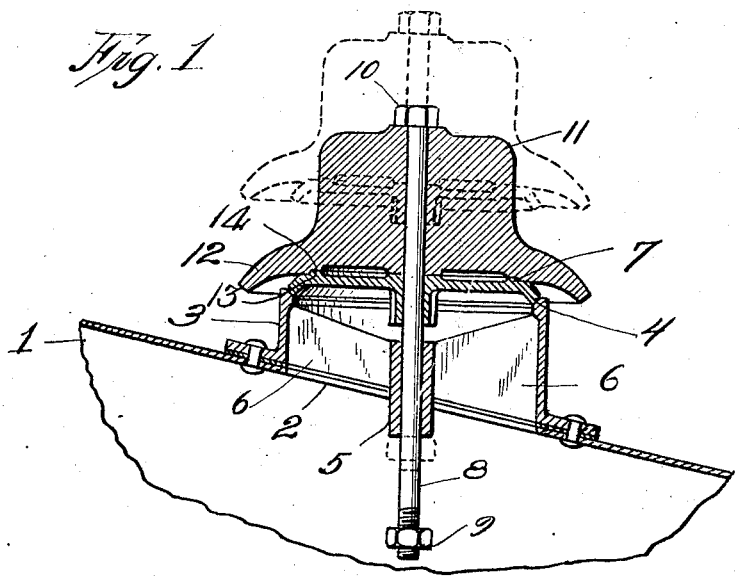
Figure 2:
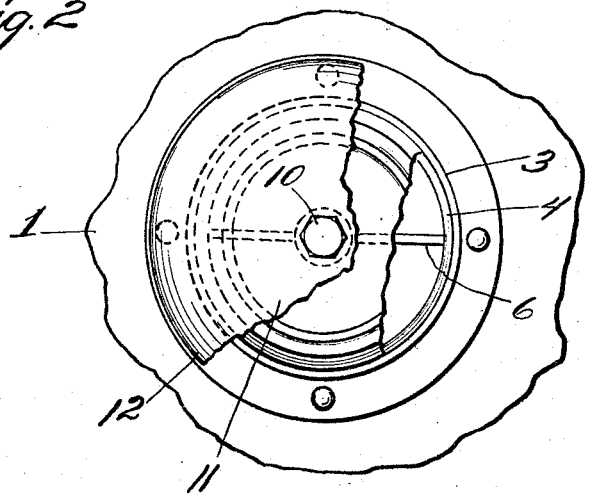

With this object in view, the invention consists in certain novel and useful features of construction and combinations of parts as hereinafter described and claimed; and in order that it may be fully understood, reference is to be had to the accompanying drawing, in which:

Figure 1 is a vertical section of a valve mechanism embodying the invention; and Figure 2 is a plan view partly broken away.

Referring to the drawing in detail, 1 indicates a tank or gas line within which fluid may be stored or flow, under substantial pressure, and 2 is a relief opening therein surrounded with an air-tight relation, by an upstanding collar 3, provided at its upper extremity with an upwardly-facing valve seat 4. Centrally of the collar and opening is a vertical tubular guide 5, integrally connected by a plurality of radial ribs 6 with the collar.

A valve 7 of the type shown or of any other suitable or preferred type, is adapted for normal engagement with said valve seat, and is rigidly secured upon a vertical rod 8 extending slidingly through guide 5, and secured upon the lower end of said rod is a retaining nut 9 or the like, adapted in the event of excessive elevation or unseating action of the valve, to engage the lower end of the guide 5 and thus prevent complete dislocation of the valve from the collar.

The rod 9 is equipped with a head 10 at its upper end, and secured upon the rod between said head and the valve is a weight 11, the imposition of said weight on the valve, guarding against unseating movement of the latter unless an excess pressure is created within the tank or line. In order to provide a practical construction in which the valve is readily removable for replacement, said weight 11 and valve 7 are formed of two members, the valve 7 being formed with an upstanding annular rib or flange 13 which is received with a shouldered recess 14 formed on the underface of the weight. With this construction, it will be apparent that the parts are locked against accidental dislodgment of the weight from proper position on the valve. The said weight is also provided at its lower end with an outwardly and downwardly flaring skirt 12, the same bearing such relation to the collar and the valve, that pressure escaping up through the collar when the valve is unseated, shall impinge against said skirt, which thus adds its area to that of the valve for permitting the valve to remain unseated until the pressure is definitely lowered within the tank or line to such extent that when the valve is reseated it maintains its position until excess pressure is again created within the tank or line. In other words, by the particular arrangement of the valve and the skirt projecting outwardly beyond the valve, the pressure which raises the valve may be partly dissipated without the valve dropping back immediately upon its seat. When the pressure drops sufficiently, however, the valve will return to its seat and will then, in conjunction with the weight, be sufficient to resist reelevation until the internal pressure of the tank is again excessive. This construction, therefore, guards against undue chattering and rapid deterioration from such cause, of the valve.

From the above description it will be apparent that I have produced a relief valve embodying the features of advantage set forth as desirable, and which may be modified in minor particulars without departing from the principle of construction and mode of operation involved.

I claim:

A tubular member terminating at one end in an upwardly facing beveled valve seat and formed with a valve guide, a valve stem sliding in said valve guide, a relatively flat plate having its periphery slightly downturned and forming a beveled valve and having a central opening for the reception of said valve stem and normally resting on said valve seat, and a weight resting on said valve and interlocked therewith, said weight having a skirt flaring downwardly and outwardly to deflect gas escaping through said tubular member in such a direction as to secure a substantially vertically upward reaction to maintain the valve in open position.

In witness whereof I hereunto affix my signature.

CHARLES P. BUCK.